(12) United States Patent
Troesch et al.

(10) Patent No.: US 11,551,501 B2
(45) Date of Patent: Jan. 10, 2023

(54) ACCESS CONTROL SYSTEM HAVING RADIO AND FACIAL RECOGNITION

(71) Applicant: INVENTIO AG, Hergiswil (CH)

(72) Inventors: Florian Troesch, Erlenbach (CH); Paul Friedli, Remetschwil (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 16/955,311

(22) PCT Filed: Dec. 13, 2018

(86) PCT No.: PCT/EP2018/084795
§ 371 (c)(1),
(2) Date: Jun. 18, 2020

(87) PCT Pub. No.: WO2019/121335
PCT Pub. Date: Jun. 27, 2019

(65) Prior Publication Data
US 2021/0049847 A1    Feb. 18, 2021

(30) Foreign Application Priority Data

Dec. 20, 2017   (EP) .................................. 17209068

(51) Int. Cl.
*G07C 9/25* (2020.01)
*G07C 9/29* (2020.01)
*G06V 40/16* (2022.01)

(52) U.S. Cl.
CPC .......... *G07C 9/257* (2020.01); *G06V 40/172* (2022.01); *G07C 9/29* (2020.01)

(58) Field of Classification Search
CPC ....... G07C 9/257; G07C 9/29; G06K 9/00288
See application file for complete search history.

(56) References Cited

U.S. PATENT DOCUMENTS 6,819,219 B1 * 11/2004 Bolle ................... G07C 9/257
340/5.52
6,971,029 B1    11/2005 Avery, IV et al.
(Continued)

FOREIGN PATENT DOCUMENTS

CN    1415527 A    5/2005
CN    105654584 A    6/2016
(Continued)

OTHER PUBLICATIONS

"Using ePassport gates at airport border control" (Anonymous, UK 2017).
(Continued)

*Primary Examiner* — Nabil H Syed
(74) *Attorney, Agent, or Firm* — Wiggin and Dana LLP; Pierre R. Yanney (57) ABSTRACT

An access control system receives a device-specific identifier of a mobile electronic device and an electronic reference template for facial parameters of a user. The reception takes place when the mobile device is located in a public zone, from which the user can request access to an access-restricted zone. A memory unit stores the identifier of the mobile device and the reference template, which are received by a transmitting and receiving unit, as belonging to the user present in a public zone. An image processing unit generates a real-time template for facial features of the user based on an image of the user when the user requests access to the access-restricted zone. It determines if the real-time template matches a reference template stored in the memory unit to a defined degree, wherein the user is recognized as an access-requesting user in the event of a match.

11 Claims, 3 Drawing Sheets

(56) References Cited

U.S. PATENT DOCUMENTS

| | | | |
|---|---|---|---|
| 9,589,397 B1 | 3/2017 | Christopher et al. | |
| 2007/0245158 A1* | 10/2007 | Giobbi | H04L 9/0866 |
| | | | 713/186 |
| 2007/0252001 A1* | 11/2007 | Kail | G07C 9/33 |
| | | | 235/380 |
| 2015/0221151 A1* | 8/2015 | Bacco | G06K 9/00288 |
| | | | 340/5.83 |
| 2019/0108697 A1* | 4/2019 | Haidacher | G07C 9/00563 |
| 2019/0172281 A1* | 6/2019 | Einberg | G06K 9/00255 |
| 2019/0213816 A1 | 7/2019 | Grigorov et al. | |
| 2020/0279269 A1* | 9/2020 | Wagner | G06Q 20/40145 |

FOREIGN PATENT DOCUMENTS

| | | | |
|---|---|---|---|
| CN | 106537478 A | 3/2017 | |
| CN | 106934787 A | 7/2017 | |
| CN | 106981107 A | 7/2017 | |
| EP | 1475754 A1 * | 11/2004 | G07C 9/27 |
| EP | 1475754 A1 | 11/2004 | |
| JP | 2007157022 A | 6/2007 | |
| JP | 3212933 U | 10/2017 | |
| WO | WO2010112586 A1 | 10/2010 | |
| WO | WO2011141627 A1 | 11/2011 | |
| WO | WO201614313 A1 | 1/2016 | |
| WO | WO2016010508 A2 | 1/2016 | |

OTHER PUBLICATIONS

"Robust Face Detection and Tracking for Real-Life Applications" (Byun H et al., US 2003).
OTIS eCall SmartPhone App FactSheet, Otis Elevator Company, 2016, 2 Pages; Retrieved from www.otis.com.
KONE Remote Call FactSheet, Smartphone Application for Kone Polaris™ 900 Destination Control System, Kone, 2013, 2 Pages; Retrieved fromwww. kone.com.

\* cited by examiner

ACCESS CONTROL SYSTEM HAVING RADIO AND FACIAL RECOGNITION

CROSS-REFERENCE TO RELATED APPLICATIONS

This application is the national phase application under 35 U.S.C. § 371 claiming the benefit of priority based on International Patent Application No. PCT/EP2018/084795, filed on Dec. 13, 2018, which claims the benefit of priority based on European Patent Application No. 17209068.0, filed on Dec. 20, 2017. The contents of each of these applications are herein incorporated by reference.

FIELD OF THE INVENTION

The technology described herein generally pertains to an access control system that grants an authorized user access to an access-restricted zone in a building or a compound. Exemplary embodiments of the technology particularly pertain to an access control system with a transmitting and receiving unit and to a method for operating such an access control system.

BACKGROUND OF THE INVENTION

Access control systems can be designed in many different ways. For example, the designs may concern the way, in which users (persons) have to identify themselves as having access authorization, e.g. with a key, a magnetic card, chip card or RFID card or with a mobile electronic device (such as a mobile telephone). WO 2010/112586 A1 describes an access control system, in which a mobile telephone carried along by a user transmits an identification code to an access node. If the identification code is determined to be valid, the access node transmits an access code to the mobile telephone, which displays the access code on a screen. When the user holds the mobile telephone at a camera such that it can detect the displayed access code, the access control system checks if the detected access code is valid. Access is granted to the user if the access code is valid. This access control systems provides a certain ease of use because the users do not have to carry along any credentials or conventional keys and do not have to remember any access code. Instead, the mobile electronic device, which many users already carry along anyway for communication purposes, fulfills the function of a credential or key.

In these access control systems, the users have to handle the keys, cards or mobile devices. This handling may be cumbersome, particularly in areas of a building with a high volume of moving people such as a lobby, and impair the flow of people. Consequently, there is a need for another technology that is even more user-friendly.

SUMMARY OF THE INVENTION

One aspect of such a technology concerns a method for operating a system for controlling access to an access-restricted zone in a building or compound. The system comprises a transmitting and receiving unit for the radio communication with mobile electronic devices carried along by users, a memory unit and an image processing unit. A device-specific identifier of a mobile electronic device of a user and an electronic reference template for facial parameters of the user are received by the transmitting and receiving unit when the mobile electronic device is located in a public zone, from which the user can request access to the access-restricted zone. The received identifier of the mobile electronic device and the electronic reference template are stored in the memory unit in the form of a dataset belonging to a present user. A plurality of datasets of present users can be stored in the memory unit. A real-time template for facial features of the user is generated when the user requests access to the access-restricted zone, wherein the real-time template is generated by the image processing unit based on an image of the user. It is determined if the real-time template matches a reference template stored in the memory unit to a predefined degree, wherein the user is recognized as an access-requesting user in the event of a match.

Another aspect of the technology concerns a system for controlling access to an access-restricted zone in a building or a compound. The system comprises a transmitting and receiving unit for the radio communication with a mobile electronic device carried along by a user. The transmitting and receiving unit is designed for receiving a device-specific identifier of the mobile electronic device and an electronic reference template for facial parameters of the user, wherein the reception takes place when the mobile electronic device is located in a public zone, from which the user can request access to the access-restricted zone. A memory unit of the system stores the identifier of the mobile electronic device and the reference template of the user, which were received by the transmitting and receiving unit, as belonging to a user present in a public zone. A plurality of user profiles of users having access authorization can be stored in the memory unit. The system furthermore comprises an image processing unit that is designed for generating a real-time template for facial features of the user based on an image of the user when the user requests access to the access-restricted zone, as well as for determining if the real-time template matches a reference template stored in the memory unit to a predefined degree, wherein the user is recognized as an access-requesting user in the event of a match.

The technology described herein creates an access control system, in which the user does not have to handle the mobile electronic device, particularly when the user is already located at or near the access point (e.g. a lock or barrier). A first phase of a verification as to whether the user has access authorization already takes place when the user is still located relatively far from the access point. For example, the user can move in the direction of the access point to the access-restricted zone while the mobile electronic device of the user already is or was in communication with the transmitting and receiving unit of the access control system in an exemplary embodiment. The transmitting and receiving unit receives the identifier of the mobile electronic device and the reference template of the user. A user profile for the user is stored if the user is registered as having access authorization in the access control system. When the user enters the detection range of a camera of the access control system, facial features of the user are determined based on a camera image and defined as a real-time template in a second phase. If the real-time template matches a stored reference template to a defined degree, the user is recognized and a building action for the user can be initiated without the user having to handle the mobile electronic device. In this way, an authorized user can access the access-restricted zone and utilize the building action in a virtually seamless manner.

The technology described herein furthermore creates an access control system, in which no central storage of facial templates takes place in a user profile that is created, e.g., for a prolonged period of time (such as months or years). The reference template of a user is stored on the mobile device of the user (and therefore controlled by the user) and only transmitted to the access control system when the user is actually on site, e.g., in order to enter an access-restricted zone in a building and to utilize a building action. Even in this case, the reference template only is temporarily stored in the access control system until the user is either granted access or once again located outside the radio range. In this way, the technology contributes to appropriately taking into account the interests of a user with respect to data and privacy protection.

A large number of users (e.g. several dozen or several hundred users) may be authorized to access an access-restricted zone in a building or an area. In such a situation, the transmitting and receiving unit receives a plurality of identifiers and reference templates, which are stored in the memory unit in the form of datasets. Nevertheless, the technology described herein provides the advantage that the verification of a match takes place quickly because the real-time template generated on site is only matched with the reference templates of actually present users. A present user can therefore gain access to the access-restricted zone without significant hold-up or delay. This reduces the risk of a waiting line forming in front of the access point, particularly at a high volume of moving people.

The technology not only provides a faster verification, but can also be used for high-security applications, for example because an authentication takes place via a secured (encrypted) radio link. The wirelessly transmitted identifier must belong to a registered user in the system; in this way, the user can be recognized and the rights (e.g. access rights) defined for the user can be determined. In addition to the radio link, the optical recognition of the face of the user is used as an additional channel. This optical channel makes it possible to identify which of the potentially numerous present users actually requests access such that access is only granted to this user and the building action defined for this user is carried out.

The technology also reduces the effort for managing user profiles. Since the reference templates are not centrally stored, it is also not necessary to update these reference templates, e.g. if the appearance of a user has changed after some time. The (current) reference template is stored on the respective mobile device by each user himself. Prior to the initial use of a mobile device in accordance with the technology described herein, the user takes an image of himself and stores this image in the mobile device in the form of a reference template. Subsequently, each user can be reminded to take a new (current) image of himself, e.g. within regular intervals. In this way, the real-time template of a user matches the reference template of the user to a high degree.

In the technology described herein, the verification of a match is on the one hand restricted to a limited quantity of reference templates. On the other hand, the authentication of a user takes place based on the received identifier, which in the event of a user having access authorization is assigned to a stored user profile. With respect to the image processing unit, this means that the demands on an image processing algorithm implemented therein, e.g. with respect to the recognition accuracy, are relatively low. In comparison with an image processing algorithm that has the function of recognizing a person with high recognition accuracy based on a relatively large number of facial features (i.e. the degree of the match must be relatively high, for example greater than about 90%), it suffices to assign relatively few facial features to a reference template of a present user in the technology described herein. In addition, the degree of the match can be defined, for example, between about 60% and about 90%. It is therefore possible to use a cost-efficient image processing algorithm; however, the security requirements can nevertheless be ensured.

In an exemplary embodiment, the verification of a match comprises the generation of a result signal. A building action is initiated in the event of a match. The building action is specific to the recognized user. This building action is determined by reading a user profile of the recognized user, which is stored in the memory unit; for example, this user profile may indicate the floor, which the user is authorized to access. The user-specific building action may comprise unlocking of a building door (e.g. an office or apartment door including one or more doors located on the way from the access point to the office or apartment door). In connection with an elevator system, the user-specific building action may also comprise the registration of a destination call to a destination floor defined for the user. The ease of use is thereby improved because the user can directly walk to an assigned elevator car without having to input an elevator call himself. The user-specific building action may also comprise a combination of unlocking a building door and registering a destination call.

The result signal also indicates that the user has access to the access-restricted zone whereas the result signal indicates that the user does not have access to the access-restricted zone in the event of a mismatch. In an exemplary embodiment, a control signal can be generated as a function of the result signal in order to release a (physical) barrier (such as a gate, door or turnstile). An unreleased barrier remains blocked. In another exemplary embodiment, the control signal activates an information unit in the event of a denial of access. The information unit can be used, for example, in connection with an access point without physical barrier. If an unauthorized user is detected at the access point, the information unit may in one variation generate an alarm that can be (acoustically and/or visually) perceived at the access point. In another variation, the control signal may alert a security service that subsequently screens the user identified as having no access authorization.

In an exemplary embodiment, the radio link between the transmitting and receiving unit and a mobile electronic device of a user is realized in accordance with a Bluetooth standard or a WLAN/WiFi standard. This is advantageous because standard mobile telephones or smartphones are already equipped with technology according to one of these standards such that no special devices are required.

The technology described herein also allows flexibility with respect to the identifier of a mobile device. The identifier of a mobile device may comprise, for example, a permanently assigned device identification number of the mobile device or a telephone number assigned to the mobile device. In an exemplary embodiment, each mobile device is equipped with application-specific software that generates a unique and time-invariant identifier for the mobile device. The identifier allows a positive identification of a mobile device (regardless of whether it comprises a device identification number or telephone number or is generated by software).

In an exemplary embodiment, the image processing unit has a modular structure; an image processing module generates the real-time template based on a camera image and an evaluation module, which is connected to the image processing module and the memory unit, generates a result signal that indicates whether that the real-time template matches a reference template. This type of modularity allows an efficient adaptation of the modules to different requirements (such as the implementation of a cost-efficient image processing algorithm in the evaluation module).

In an exemplary embodiment, modularity is also realized with respect to a processor that is connected to the image processing unit. Depending on the result signal, the processor generates a control signal in order to initiate reading of a user profile of the recognized user stored in the memory unit and to subsequently initiate a user-specific building action. The processor furthermore controls the access control system in such a way that the user is granted or denied access.

BRIEF DESCRIPTION OF THE DRAWINGS

Different aspects of the enhanced technology are described in greater detail below with reference to exemplary embodiments illustrated in the figures. Identical elements are identified by the same reference symbols in the figures. In these figures.

DETAILED DESCRIPTION OF EMBODIMENTS OF THE INVENTION

Figure 1:
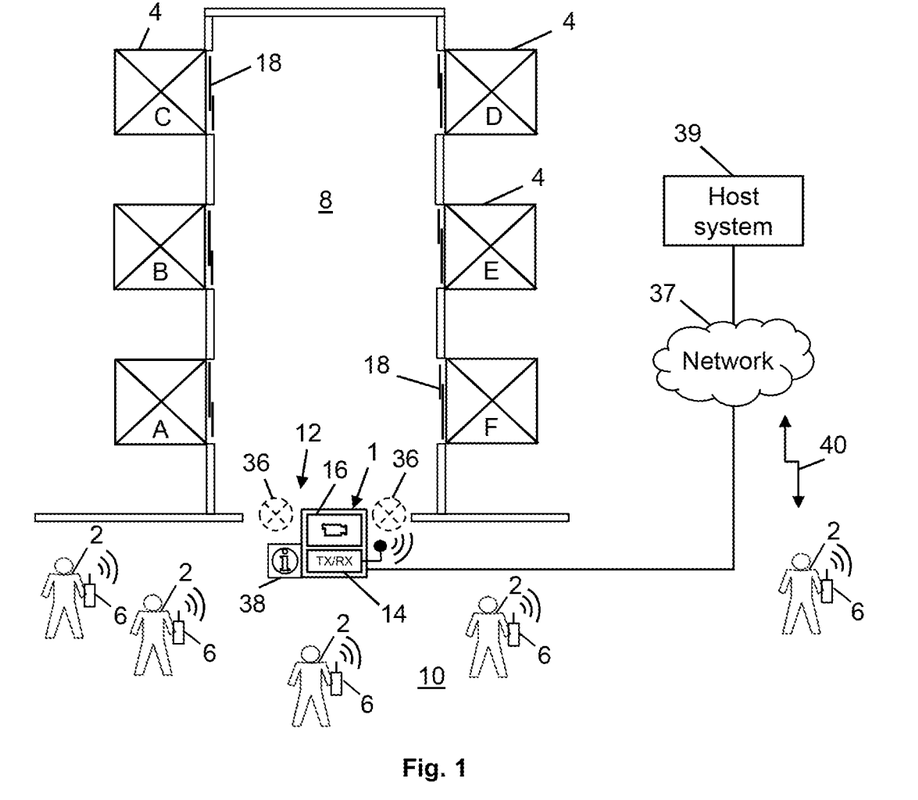
FIG. 1 shows a schematic representation of an application example of an access control system in connection with a building.

FIG. 1 shows a schematic representation of an application example of an access control system 1 in connection with a situation in a building, of which only a few walls, rooms 4 and zones 8, 10 are illustrated in order to provide a better overview. For example, the rooms 4 may be offices, apartments, halls and/or elevator cars of an elevator system. In the application of the access control system 1 illustrated in FIG. 1, multiple users 2, who carry along mobile electronic devices 6 (also simply referred to as mobile devices 6 below), are located in the zone 10. In this example, the zone 10 is not subject to any access restriction and therefore also referred to as public zone 10 in the following description. The public zone 10 may be an area in the building or outside the building. An access point 12 separates the public zone 10 from the zone 8, which is subject to an access restriction and borders on the rooms 4. A person skilled in the art understands that the access control system 1 is not limited to applications within a building, but rather can also be used analogously for controlling access to an access-restricted zone in a compound. In this description, the term "building" refers, e.g., to residential buildings, commercial buildings, sports arenas and shopping centers, but also to ships.

The access control system 1 monitors the access point 12 such that only authorized users 2 can enter the zone 8, e.g. by blocking or releasing a door, a gate, a turnstile or another physical barrier or lock, by controlling (e.g. activating) an information unit 38 upon the detection of an unauthorized user 2 in the event of an access point without physical barrier or by combining these measures. For example, the information unit 38 may trigger an optical and/or acoustical alarm or initiate the notification of a security service. In FIG. 1, the access control system 1 is arranged at the access point 12.

The access point 12 consists of multiple individual locks depending on the volume of moving people, for which the access control system 1 is designed; in FIG. 1, for example, each of the two turnstiles 36 may represent a lock. A person skilled in the art understands that the access control system 1 or its components may be arranged in different ways in a concrete implementation.

For example, the rooms 4 illustrated in FIG. 1 may belong to a group of elevators that comprises, for example, six elevators (A-F). In an exemplary embodiment, the recognition of a user 2 at the access point 12 means that the user 2 would like to be transported to a destination floor defined for this user 2 by means of one of the elevators. A destination call, to which an elevator is assigned by an elevator control, is initiated upon recognition of the user 2. The user 2 is notified of the assigned elevator, for example, by means of a display unit. A display unit may be respectively assigned to each turnstile 36 in the situation illustrated in FIG. 1. When the user 2 utilizes one of the turnstiles 36 illustrated in FIG. 1, for example, the access control system 1 detects the turnstile 36, at which the user 2 is located, and activates the display unit arranged at this turnstile in order to display the assigned elevator (e.g. "A").

Figure 2:
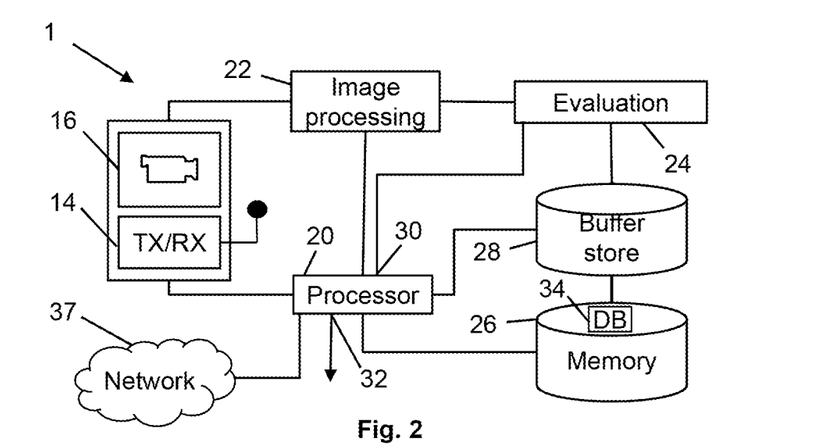
FIG. 2 shows a schematic representation of an exemplary embodiment of an access control system.

As indicated in FIG. 1, the access control system 1 according to an exemplary embodiment comprises a transmitting and receiving unit 14 (identified by TX/RX in FIG. 1) and a camera 16 that forms part of an image processing unit; additional components of the access control system 1 are illustrated in FIG. 2. In an exemplary embodiment described herein, the transmitting and receiving unit is designed for receiving radio signals, wherein said transmitting and receiving unit is also referred to as transceiver 14 in the following description. The transceiver 14 communicates with the mobile electronic devices 6 when they are located in the radio range of the transceiver 14, i.e. when a radio signal transmitted by a mobile device 6 has at the location of the transceiver 14 a signal strength (expressed, e.g., in the form of an RSSI value (Received Signal Strength Indicator)), which is greater than a threshold value defined for a secure reception. The communication takes place, for example, via a near-field radio network such as a Bluetooth radio network, a WLAN/WiFi radio network or a ZigBee radio network. Bluetooth is a standard according to IEEE 802.15.1, WLAN/WiFi is a standard according to IEEE 802.11 and ZigBee is a standard according to IEEE 802.15.4; radio networks according to these standards serve for wirelessly linking devices over a short distance of about a few meters to about one hundred meters. In this case, the radio network forms the interface, via which the mobile electronic devices 6 and the transceiver 14 can communicate with one another.

In the situation illustrated in FIG. 1, the technology described herein can be advantageously used for operating the access control system 1 with the least complexity possible and for conveniently granting the user 2 access to the access-restricted zone 8. The operation of the access control system 1 according to an exemplary embodiment is briefly summarized below: as soon as a user 2 is located in the radio range of the transceiver 14, the mobile device 6 of the user automatically communicates with the transceiver 14 via a radio link and the mobile device 6 transmits its device-specific identifier to the transceiver 14. The mobile device 6 also transmits facial parameters of the user 2 to the transceiver 14 in the form of an electronic reference template. In the situation according to FIG. 1, the transceiver 14 receives a plurality of identifiers and reference templates. The access control system 1 therefore "knows" how many mobile devices 6 are located in the radio range at a certain time and, if their users 2 are users 2 registered for the building, to which users 2 the mobile devices 6 belong. At this point, the access control system 1 can check the rights defined for each registered user 2 in the building (e.g. access authorization to one or more rooms 4 and/or floors including potential time limits).

The thusly detected users 2 represent a group of present users 2. If one of the present users 2 would like to gain access to the access-restricted zone 8, the user 2 moves in the direction of the access point 12, wherein this motion is detected by the access control system 1. The access control system 1 generates a dataset with facial features (real-time template) of this user 2 in the course of an image processing and facial recognition process and compares this real-time template with the stored reference templates assigned to the present users 2. This comparison is restricted to the group of present users 2; consequently, only the datasets of this group are searched to the effect whether the determined dataset matches one of the stored datasets. This makes it possible to determine which of the present users 2 actually would like to gain access at this point, as well as the rights of this user 2. For example, a building action defined in a user profile may be initiated for this user 2; for example, a destination call may be registered for the user 2 and subsequently assigned an elevator that transports the user 2 to the floor, on which the workstation of the user 2 is located.

FIG. 1 furthermore shows a communication network 37, which in an exemplary embodiment is communicatively linked to a host system 39 and the access control system 1. This figure also shows that a user 2 can communicate, e.g. with the host system 39 or a web portal, via the communication network 37 by means of a communication link 40. Exemplary applications of the communication network 37 and the host system 39 are described in connection with FIG. 4.

FIG. 2 shows a schematic representation of an exemplary embodiment of the access control system 1. In this exemplary embodiment, the access control system 1 has a modular structure and comprises an image processing unit that not only includes the camera 16, but also an image processing module 22 (image processing in FIG. 2) and an evaluation module 24 (evaluation in FIG. 2). The access control system 1 furthermore comprises the transceiver 14, a processor 20, a memory unit 26 (memory in FIG. 2) and an intermediate memory unit 28 (intermediate memory in FIG. 2). A person skilled in the art understands that at least one of the memory units 26, 28 can also be assigned to the image processing unit or that the function of the intermediate memory unit 28 can also be fulfilled by the memory unit 26 such that the intermediate memory unit 28 can be eliminated in an exemplary embodiment.

The processor 20 has an output 32 for a control signal and an input 30 for a result signal generated by the evaluation module 24. The processor 20 controls the access control system 1 in dependence on the result signal in such a way that the user 2 is granted or denied access. If access is granted, for example, a destination call can also be initiated and the elevator assigned to this destination call can be displayed to the user 2. If the zones 8, 10 are separated, for example, by a physical barrier (such as the turnstile 36 in FIG. 1), the control signal releases the barrier (e.g. in connection with the display of the assigned elevator) or blocks this barrier. However, if the zones are separated without a physical barrier, the control signal activates, for example, the information unit 38 in order to trigger an alarm or alerts a security service in the event of an unauthorized user 2. If a barrier is provided, the information unit 38 may also be activated in order to display to the user 2 or a security service that the barrier has been released or blocked.

The camera 16 generates a camera image of a user 2 (particularly the face of a user), who is located in the detection range of the camera 16, when the user 2 would like to enter the access-restricted zone 8 at the access point 12. In an exemplary embodiment, the camera 16 comprises a digital camera with selectable and/or adjustable properties; the camera images therefore are digital datasets (digital camera images (also referred to as digital images)) in this exemplary embodiment. The properties of the digital camera such as the resolution (e.g. indicated in megapixels), the exposure and the focal length are respectively chosen or adjusted in such a way that a camera image (digital image) can be evaluated and the face of the user 2 can be recognized with evaluable quality in the digital image. For example, the digital image is recorded in a JPEG format, but may also be recorded in another format such as in the BMP or JPEG2000 format.

The camera 16 may be equipped with a sensor module or connected to a separate sensor module, which activates the camera 16 when it detects the presence of a user 2 in the detection range of the camera 16. For example, the sensor module may comprise a proximity sensor that may be realized in the form of an ultrasonic sensor, an infrared sensor or an optical sensor (e.g. light barrier, brightness sensor). In an exemplary embodiment, the presence of a user 2 in the detection range of the camera 16 can be alternatively detected by detecting changes in the detection range. For example, if the user 2 enters the detection range and the camera 16 is continuously in an active state, the camera 16 records changes in front of an essentially static background; these changes are interpreted as a presence.

The transceiver 14 and the camera 16 (including other components of the image processing unit) may be accommodated in a housing that is arranged, for example, at the access point 12 as illustrated in FIG. 1. The transceiver 14 and the camera 16 (including other components of the image processing unit) may alternatively also be arranged separately of one another in the form of separate units, e.g. spatially separated from one another in an area around the access point 12, wherein the camera 16 has to be arranged in such a way that it essentially only detects the user 2 who actually requests access. Multiple cameras 16 may be provided depending on the design of the access control system 1, wherein a camera 16 may be respectively assigned, for example, to each barrier (e.g. turnstile 36).

The evaluation module 24 is illustrated in the form of a separate unit that is connected to the image processing module 22, the processor 20 and the intermediate memory unit 28. In an exemplary embodiment, the evaluation module 24 and the image processing module form a unit. The memory units 26, 28 are likewise illustrated in the form of separate units; depending on the design, they may be combined in a memory unit, in which they occupy separate memory areas. The memory units 26, 28 may irrespectively comprise, for example, a hard disk drive (HDD) or CD/DVD drive, a solid-state-drive/solid-state-disc (SSD), combinations thereof or other memory units for digital data.

The aforementioned unit consisting of the evaluation module 24 and the image processing module 22 comprises at least one processor unit that carries out a computer-assisted image processing method. Image processing methods are known, for example, from U.S. Pat. No. 8,494,231 B2. A basic description of image processing for the purpose of facial recognition is described in the publication "Gesichtserkennung" of the German Federal Office for Security in Information Technology (available at www.bsi.bund.de under the topic Biometrics). This publication distinguishes between the three main steps "generating template," "generating reference dataset" and "comparing facial images." In order to realize the comparison of two facial images as easily and quickly as possible, the features of a face are determined and stored in the form of a feature dataset that is referred to as "template." Once the face has been found in an image of a user and normalized, features other than the eyes, the nose and the mouth/chin section are searched, measured and related to one another. These extracted features are encoded, compressed and stored in the form of a feature dataset (template). In order to determine the similarity of the templates of two facial images, they are combined by means of a mathematical algorithm. This results in a degree of similarity of the templates. If the result lies within certain tolerance limits, the two templates and therefore the facial images, on which the templates are based, are classified as identical.

According to the technology described herein, the mobile device 6 transmits its device-specific identifier and the electronic reference template of the user 2 to the transceiver 14 as soon as it is located in the radio range of the transceiver 14. The processor 20 controls the storage of the received identifier and the received reference template in the form of a dataset in the intermediate memory unit 28. Multiple users 2 are located in the public zone 10 in the situation illustrated in FIG. 1. As an example, it is assumed that the mobile devices 6 of the present users 2 are designed for utilizing the technology described herein, which among other things includes the transmission of an identifier and a reference template. A few of the present users 2 may request access to the access-restricted zone 8, some users may be on their way from the zone 8 to a building exit and other users may be on their way to another part of the building. In the situation shown, this means that not every user 2 located in the public zone 10 actually wants to enter the zone 8. From the perspective of the access control system 1, however, all present users 2 are potential users 2 who sooner or later could request access.

In such a situation, the intermediate memory unit 28 stores a dataset for each present user 2, wherein said dataset contains the identifier of the mobile device 6 assigned to the user 2 and the reference template of the user 2. This may concern mobile devices 6, the users 2 of which are registered as users 2 having access authorization in the access control system 1, as well as mobile devices 6, the users 2 of which are not registered. When a user 2 leaves the public zone 10 such that the associated mobile device 6 is located outside the radio range, the dataset stored for this user 2 in the intermediate memory unit 28 is deleted and the intermediate memory unit 28 is updated.

The access control system 1 determines the present users 2 with the aid of the communication between the mobile devices 6 and the transceiver 14. A radio module such as a module according to a Bluetooth standard is activated in each mobile device 6 in order to communicate with the transceiver 14 as soon as it is located in the radio range of the transceiver 14. The mobile device 6 is correspondingly configured for transmitting the device-specific identifier and the reference template. For example, it may comprise an application-specific software application (also referred to as app) that can be activated, e.g. by the user 2. In an exemplary embodiment, the application-specific software application is used in connection with the access control and the utilization of elevators. The application-specific software generates a unique and time-invariant identifier for the mobile device 6 in an exemplary embodiment. Such a software-generated identifier represents an alternative to the aforementioned device identification number and a telephone number.

A user profile is created in the access control system 1 for each registered user 2, i.e. the user profile is stored in a database 34 in the form of a dataset. In an exemplary embodiment, the database 34 is established in the memory unit 26. The user profile comprises personal data of the user 2 (e.g. name, reason for authorization (resident, employee, external service provider, visitor)), access authorizations (e.g. certain rooms 4 and floors) and potential time limits (e.g. access from Monday to Friday between 7 a.m. and 8 p.m.). The user profile may also be stored in a database of a building management system as an alternative to the storage of the user profile in the access control system 1, wherein the access control system 1 can access this database via a communication network.

When one of the present users 2 would like to gain access to the access-restricted zone 8, the user 2 enters a detection range of the camera 16 arranged at the access point 12 and the camera 16 generates one or more digital images or a video recording, which respectively are/is temporarily stored in the form of a digital dataset for further processing. The image processing module 22 determines the real-time template based on this dataset as explained elsewhere in this description. Once the real-time template has been generated, the evaluation module 24 starts a search algorithm in order to determine if the real-time template can be assigned to a present user 2 in the intermediate memory unit 28. The user 2 of the group of users 2, who would like to gain access at this point, is recognized if the real-time template matches a stored reference template to a defined degree.

For example, the mobile device 6 may be a mobile telephone, a smartphone, a tablet PC or a smartwatch, wherein these devices are usually equipped with hardware that allows communication via a near-field radio network. However, the mobile device 6 may also be realized in the form of a pair of spectacles with a miniature computer or another computer-assisted device worn on the body (also referred to as "wearable device") if these devices are intended for near-field communication and for the storage of data (in this case: data of a reference template for facial parameters). Depending on the design of the mobile device 6, it may comprise, e.g., a graphical user interface (also referred to as GUI) in order to selectively activate and deactivate the mobile device 6 and its functions.

An exemplary access control method is described below with reference to FIG. 3 as an aspect of a method for operating the access control system 1 with the understanding of the above-described basic system components and their functionalities. The description refers to a user 2 who would like to enter the access-restricted zone 8 at the access point 12, e.g. in order to use an elevator. The user 2 carries along a mobile device 6 and has activated its radio module (e.g. for Bluetooth communication). In addition, a reference template for facial features of the user 2 is already stored in the mobile device 6. An associated software application is likewise activated. The method begins in step S1 and ends in step S10.

When the user 2 with his mobile device 6 is located in the public zone 10 and in the radio range of the transceiver 14, the transceiver 14 receives a device-specific identifier transmitted by the mobile device 6 in step S2. The transceiver 14 and the mobile device 6 communicate in accordance with the same communication standard, namely via a radio link according to a Bluetooth standard in this exemplary embodiment. The transceiver 14 also receives a reference template for facial parameters of the user 2. The identifier and the reference template essentially can be transmitted by the mobile device 6 simultaneously or successively. In FIG. 3, the transmission of the identifier and the transmission of the reference template take place in a (common) step (step S2). In another embodiment, the transmission of the reference template may also take place in a separate step.

The received identifier and the received reference template are stored in step S3.

For example, the identifier and the reference template are stored in the form of datasets in the intermediate memory unit 28.

Steps S2 and S3 are carried out for each mobile device 6 that is located in the radio range of the transceiver 14 and operates in accordance with the same communication standard as the transceiver 14. A plurality of identifiers and associated reference templates corresponding to a group of present users 2 may be stored in the intermediate memory unit 28 at a certain time depending on the number of users 2 in the public zone 10. A person skilled in the art understands that the intermediate memory unit 28 is updated once a mobile device 6 is no longer in the radio range, e.g. because the associated user 2 has left the public zone 10 without requesting access to the access-restricted zone 8 or because the associated user 2 has already entered the access-restricted zone 8. The intermediate memory unit 28 therefore stores the datasets for users 2 who are present in the public zone 10 at a certain time.

In step S4, it is determined if one of the present users 2 requests access to the access-restricted zone 8. In an exemplary embodiment, the access control system 1 detects this request with the aid of the aforementioned sensor module or the detection of background changes. For example, the sensor module detects when the user 2 enters the detection range of the camera 16, whereupon the camera 16 is activated. The method proceeds along the yes-branch to step S5 if an access request is detected. Otherwise, the method reverts back to step S2 along the no-branch.

In step S5, the activated camera 16 generates a digital image, which shows at least the face of the detected user 2, and the image processing module 22 generates a real-time template based on the digital image as explained elsewhere in this description.

In step S6, it is determined if the real-time template generated in step S5 can be assigned to a reference template stored in the intermediate memory unit 28.

During the determination according to step S6, it is checked if the real-time template matches a reference template to a defined degree in step S7. In an exemplary embodiment, the real-time template and the reference template respectively comprise a defined number of specific facial parameters and other values (e.g. eye spacing, mouth width, distance between lip top edge and lip bottom edge, distance between nose and lip bottom edge, etc.). The parameter values of the real-time template are compared with the parameter values of the reference template during the search. A match is found if the degree of similarity of the templates corresponds at least to the defined degree. The defined degree specifies a percentile match of the facial parameters of the real-time template with the facial parameters of the reference template. The defined degree can be chosen, for example, between about 60% and about 90% depending on the accuracy requirements.

The user 2 of the group of present users 2, who would like to gain access at this point, is recognized in the event of a match. In this case, the method proceeds along the yes-branch to step S9, in which a user-specific building action is carried out for this user 2. For example, the building action may consist of registering a destination call for the user 2 (in accordance with the data of the existing user profile for this user 2), assigning an elevator to this destination call and displaying the assigned elevator to the user 2 at the access point 12. The building action may also consist of unlocking one or more doors, to which this user 2 has access authorization. A person skilled in the art understands that these building actions may also be carried out in combination.

In the event of a mismatch, the method contrarily proceeds along the no-branch to step S8, in which a notification is generated. For example, the notification may inform the user 2 that an error has occurred and/or that the user 2 should consult a person responsible for the building (e.g. reception personnel, security personnel).

The security personnel may irrespectively also be notified directly in step S8.

Figure 3:
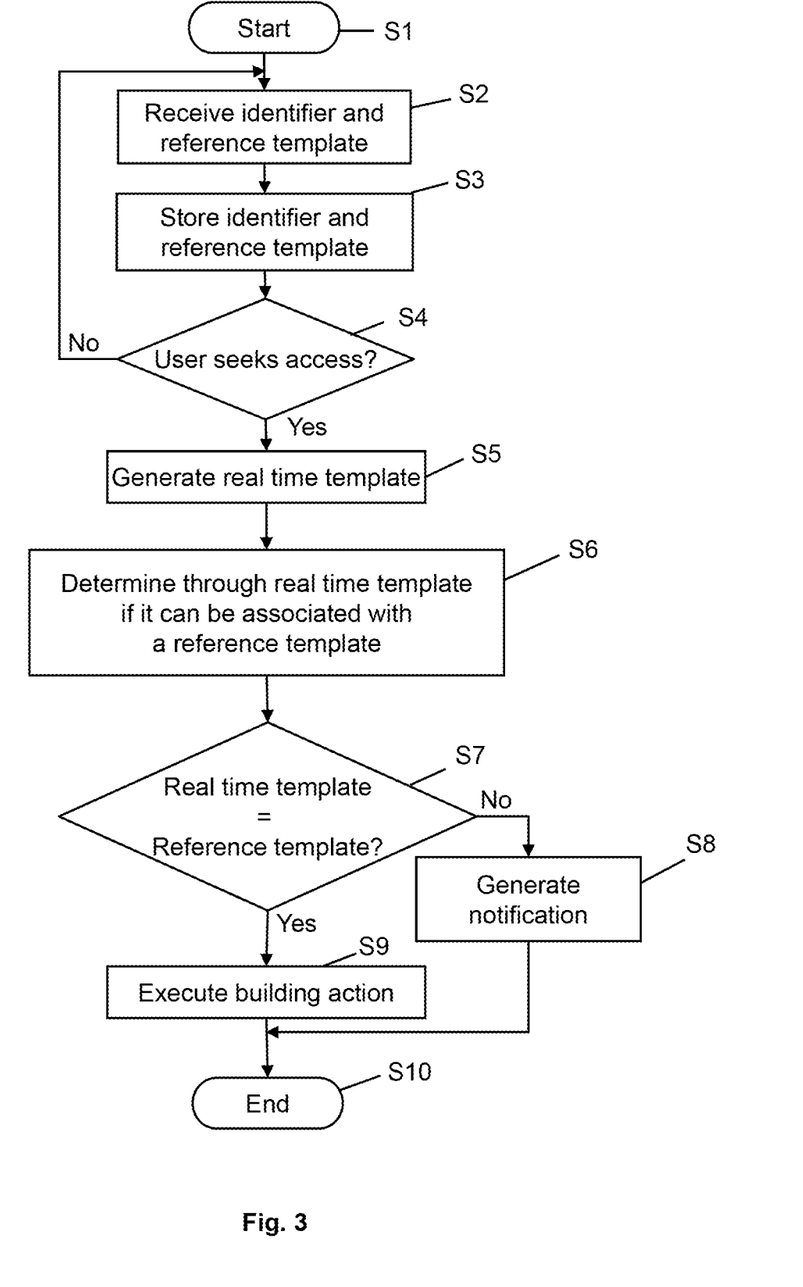
FIG. 3 shows a flow chart of an exemplary embodiment of an access control method as an aspect of a method for operating the access control system.

According to the description of an exemplary method for operating the access control system 1 with reference to FIG. 3, a user 2 does not have to handle his mobile device 6 in order to gain access to the access-restricted zone 8. The control of the access authorization can take place without being noticed by the user 2 depending on the design of the access point, i.e. with or without physical barrier.

In an exemplary embodiment, the access control system 1 is connected to an elevator system, particularly to an elevator control. The communication between the access control system 1 and the elevator control may take place via the communication network 37. If the access control takes place, for example, in the lobby of the building, which the users 2 have to pass in order to reach the elevators, a destination call can be registered each time access is granted to the respective user 2. The elevator control of the elevator system processes the destination call and assigns an elevator thereto. The elevator assigned to the destination call can be displayed to the user 2, for example, on a terminal at the access point 12 or the user can be correspondingly notified by means of speech output. Consequently, the user 2 can directly walk to the assigned elevator without having to input an elevator call.

Figure 4:
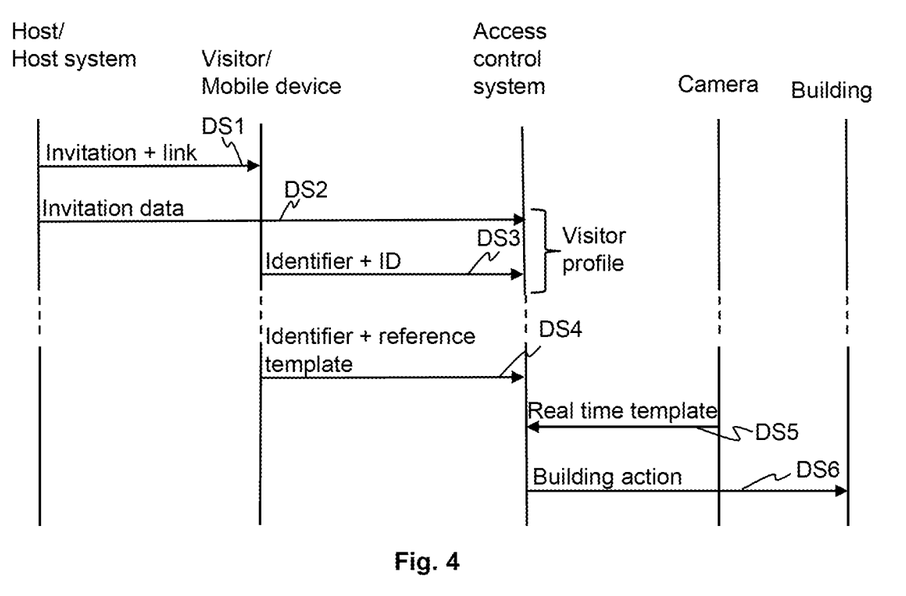
FIG. 4 shows an exemplary signal diagram for illustrating an exemplary embodiment of a visitor registration method as an aspect of a method for operating the access control system.

In the description with reference to FIG. 3, each user 2 is registered as a user 2 having access authorization in the access control system 1. Depending on the type of building, unregistered users 2 such as visitors may also request access to the access-restricted zone. FIG. 4 shows a signal diagram of an exemplary embodiment of a method that makes it possible to also conveniently grant visitors access to the access-restricted zone 8. In order to illustrate an exemplary scenario, FIG. 4 schematically shows interactions between a host or a host system 39 used by the host, a visitor or his mobile device 6, the access control system 1, the camera 16 and a building system in order to register the visitor in the control system 1 by means of a registration process, as well as to grant the visitor access and to carry out a defined building action. According to the technology described herein, the visitor therefore is also a user 2 (the reference symbol 2 is used for the visitor, as well as for one or more users, in the following description).

In this scenario, the host and the visitor 2 set up a meeting, i.e. a date and a time of day or a time period, at/in which the host should expect the visitor 2. The host subsequently generates an invitation, for example with the host system 39 (e.g. PC, notebook, tablet PC, smartphone or another electronic device) and a software application installed thereon (e.g. with the aid of Microsoft Outlook™ or similar application programs), and transmits this invitation to the visitor 2, e.g. via the communication network 37 and the communication link 40. The communication link 40 may be established, for example, via a mobile radio communication system.

In addition to the information on the meeting, the invitation also comprises an identification number that is assigned to the invitation (and identified by "ID" in FIG. 4), as well as information on a communication channel to be used by the visitor 2 in order to communicate with the access control system 1 for registration purposes. In an exemplary embodiment, the communication channel is the Internet; the information on the communication channel therefore comprises an Internet address for a web portal (identified by "link" in FIG. 4). For example, the Internet address may comprise a uniform resource locator (URL) that identifies and localizes the web portal as a resource based on the access method used (e.g. a network protocol such as HTTP or FTP) and the location of the resource in a computer network. The web portal is assigned to a computer system of the access control system 1. In an exemplary embodiment, the invitation is transmitted via the communication network 37 by means of a signal DS1; this may be realized, for example, by sending the invitation to the mobile device 6 of the visitor 2 in the form of a text message or to the e-mail address of the visitor 2 in the form of an e-mail.

The host or the host system 39 also transmits the invitation data to the access control system 1 by means of a signal DS2, e.g. via the communication network 37 and essentially simultaneously with the transmission of the invitation or at a later time. The access control system 1 creates a visitor profile for the received invitation data, e.g. under the control of the processor 20. In an exemplary embodiment, the invitation data not only comprises the information on the meeting, but also information on the host such as the name, telephone number, floor and/or apartment or office number, as well as information on the visitor (such as the name). It is furthermore possible to define a time window, within which the visitor 2 is granted access. The time window may specify, for example, that the visitor 2 is granted access about half an hour prior to and after the beginning of the meeting in the event of an early or delayed arrival of the visitor 2. The visitor profile can be deleted after the arrival of the visitor 2 or at a later time.

If the visitor 2 accepts the invitation, the communication channel specified in the invitation is used for transmitting the identification number of the invitation and the identifier of the mobile device 6 to the access control system 1. Depending on the design, the visitor may be prompted to input the identifier of the mobile device 6 (e.g. the telephone number or the device identification number). When the visitor accepts the invitation by means of the mobile device 6, the identifier of the mobile device 6 is in an exemplary embodiment likewise transmitted to the access control system 1, e.g. automatically. If an application-specific software application is installed on the mobile device 6 as described above, this software application assists the visitor 2 in accepting the invitation. The transmission of the identifier and the identification number of the invitation takes place by means of a signal DS3, e.g. via the communication network 37 and the communication link 40. The transmission of the signal DS3 may take place in accordance with a known transmission protocol such as TCP (transmission control protocol), IP (Internet protocol) or UDP (user data protocol). The access control system 1 stores the received data (identifier and identification number of the invitation) in the visitor profile.

The technology described herein can also utilize other communication channels. As an alternative to the utilization of a web portal, the invitation may prompt the visitor 2 to transmit the identifier and the identification number of the invitation to a building management. For example, the building management may manage the database 34 for the respective building, in which the user profiles of users 2 having access authorization are stored. The transmission to the building management may take place, for example, to an e-mail address of the building management specified in the invitation or to the telephone number of the building management, e.g. in the form of an SMS or MMS message. The personnel of the building management can then initiate further processing of the received data.

The invitation furthermore prompts the visitor to take a self-portrait (also referred to as "selfie"), e.g. with the camera of his mobile device 6, and to store this self-portrait on the mobile device 6. An advantage of the technology described herein can be seen in that the visitor 2 can take the selfie whenever he chooses to do so as long as it is taken prior to the meeting. In this case, the visitor 2 may be geographically located far away from the building or already in or near the building. The application-specific software application installed on the mobile device 6 also assists the visitor 2 in producing and storing the self-portrait in the form of a reference template of the visitor 2.

According to the access control method described with reference to FIG. 3, the defined building action can be carried out for the visitor 2 based on the generated visitor profile if the visitor arrives in the building at the appointed time. The transceiver 14 receives the identifier and the reference template transmitted by the mobile device 6 as soon as the visitor enters the reception range of the transceiver 14 in the public zone 10. The reception of the identifier of the mobile device 6 and the reference template takes place as described above and is indicated with a signal DS4 in FIG. 4. When the visitor subsequently enters the detection range of the camera 16, the camera 16 generates a digital image that shows the face of the visitor. The generation of the digital image by the camera 16 and the subsequent generation of a real-time template take place as described above; this is indicated with a signal DS5 in FIG. 4.

The access control system 1 checks if the real-time template matches the reference template to a defined degree. The access control system 1 furthermore checks if the visitor requests access within the time window defined in the visitor profile. If both conditions are fulfilled, the visitor is granted access and the building action is initiated; this is indicated with a signal DS6 in FIG. 4.

Depending on the design of the building, the access control system 1 may communicate with an elevator control in order to initiate an exemplary building action in the form of a destination call for the visitor 2 when access is granted. The elevator control assigns an elevator to the destination call, wherein the assigned elevator can be displayed to the visitor 2 or the visitor can be correspondingly notified by means of speech output in the region of the access point 12. The assigned elevator transports the visitor 2 to the floor, on which the host is located. The floor of the host is stored, for example, in the visitor profile in connection with the invitation data. The visitor 2 therefore does not have to bother with inputting the destination floor, particularly when visiting the building for the first time. The visitor 2 may furthermore be provided with additional information for the better orientation in the building, for example by informing the visitor 2 of the direction, in which he should walk (and potentially also how far) after exiting on the floor. The communication of such routing information may be realized, for example, by means of the mobile device 6 of the visitor 2 and/or displays on the floors or in the elevator cars. In an exemplary embodiment, the access control system 1 generates and transmits a message to the host in order to inform the host that the visitor has been granted access. The host therefore can prepare for the arrival of the visitor in a timely manner.

The invention claimed is:

1. A method for operating a system for controlling access to an access-restricted zone in a building or a compound, wherein the system comprises a transmitting and receiving unit for radio communication with mobile electronic devices carried along by users, a memory unit and an image processing unit having a camera arranged at an access to the access restricted zone, the method comprising:
  receiving from a mobile electronic device of the user, a device-specific identifier of the mobile electronic device of the user and an electronic reference template for facial parameters of the user by means of the transmitting and receiving unit as soon as the mobile electronic device is located within a radio range of the transmitting and receiving unit in a public zone, from which the user can request access to the access-restricted zone, the reference template being stored directly in the mobile electronic device by the user;
  temporarily storing the received identifier of the mobile electronic device and the electronic reference template in the memory unit in the form of a dataset belonging to a present user, wherein a plurality of data sets of present users are storable in the memory unit in order to store for each respective present user the identification of the mobile electronic device allocated to the respective present user and the reference template of the respective present user in the data set belonging to the respective present user, wherein the data set belonging to a respective present user leaving the public zone is deleted and the memory unit is updated as soon as this respective present user leaves the public zone and this user's mobile electronic device is outside the radio range of the transmitting and receiving unit;
  automatically generating a real-time template for facial features of the user as soon as the user moves in the direction of and requests access to the access-restricted zone, and comes into a detection range of the camera arranged at the access to the access restricted zone, wherein the real-time template is generated by the image processing unit based on an image of the user;
  determining by the image processing unit if the real-time template matches a reference template temporarily stored in the memory unit, wherein the user is recognized as an access-requesting user in the event of a match; and
  generating a result signal which, in the event of a match, causes a building action to be carried out, a control signal being generated as a function of the result signal in order to cause a user profile, stored in the memory unit, of the user requesting access to be read in order to determine a user-specific building action.

2. The method according to claim 1, wherein the user-specific building action comprises unlocking a building door, to which the user has access authorization, or registering a destination call to a destination floor defined for the user or a combination of unlocking a building door and registering a destination call.

3. The method according to claim 2 further comprising:
  generating a control signal as a function of the result signal in order to release a barrier such that the user can enter the access-restricted zone.

4. The method according to claim 1, wherein the image of the user is generated by the camera of the image processing unit.

5. The method according to claim 1, wherein a radio link between the transmitting and receiving unit and a mobile electronic device of a user is realized in accordance with a Bluetooth standard or a WLAN/WiFi standard, and wherein the transmitting and receiving unit receives the device-specific identifier and the reference template via the radio link when the mobile electronic device is located in the radio range of the transmitting and receiving unit.

6. The method according to claim 1, wherein the identifier is generated by application-specific software, which is active on the mobile device, and wherein the identifier is time-invariant.

7. The method according to one of claim 1, wherein the identifier comprises a device identification number or a telephone number assigned to the mobile electronic device.

8. The method according to claim 1, wherein the real-time template and the reference template respectively comprise a defined number of specific facial parameters and the defined degree lies between about 60%, and about 90%, and wherein the defined degree specifies a percentile match of the facial parameters of the real-time template with the facial parameters of the reference template.

9. The method according to claim 1, wherein a dataset is stored in the memory unit for each mobile electronic device of a user, which transmits a device-specific identifier and an electronic reference template for facial parameters of the user, when a plurality of mobile electronic devices are located in the public zone.

10. A system for controlling access to an access-restricted zone in a building or a compound, comprising:
  a transmitting and receiving unit for radio communication with a mobile electronic device carried along by a user, said transmitting and receiving unit is configured to receive from the mobile electronic device of the user, a device-specific identifier of the mobile electronic device and an electronic reference template for facial parameters of the user, and wherein the reception takes place as soon as the mobile electronic device is located within a radio range of the transmitting and receiving unit in a public zone, from which the user can request access to the access-restricted zone, the reference template being stored directly in the mobile electronic device by the user;
  a memory unit configured to temporarily store the identifier of the mobile electronic device and the reference template of the user in a data set, which are received by the transmitting and receiving unit, as belonging to a user present in a public zone, wherein the memory unit is configured to store a plurality of data sets of present users in order to store for each respective present user the identification of the mobile electronic device allocated to the respective present user and the reference template of the respective present user in the data set belonging to the respective present user, wherein the data set belonging to a respective present user leaving the public zone is deleted and the memory unit is updated as soon as this respective present user leaves the public zone and this user's mobile electronic device is outside the radio range of the transmitting and receiving unit;

an image processing unit having a camera arranged at an access to the access restricted zone and configured to:
  automatically generate a real-time template for facial features of the user based on an image of the user as soon as the user moves in the direction of and requests access to the access-restricted zone, and comes into a detection range of the camera arranged at the access to the access restricted zone, and
  determine if the real-time template matches the reference template stored in the memory unit, wherein the user is recognized as an access-requesting user in the event of a match,
  wherein the image processing unit comprises an image processing module, by means of which the real-time template is capable of being generated based on a camera image, and an evaluation module, which is connected to the image processing module and the memory unit, and wherein the evaluation module is configured to generate a result signal, which initiates a building action in the event of a match; and
a processor that is connected to the image processing unit and configured to generate a control signal in dependence on the result signal in order to initiate reading of a user profile of the recognized user, which is stored in the memory unit, and to thereby determine the user-specific building action.

11. The system according to claim 10, further comprising:
a barrier that is capable of being unlocked or blocked depending on the control signal.

\* \* \* \* \*